United States Patent
Ebiyama

(10) Patent No.: US 10,776,931 B2
(45) Date of Patent: *Sep. 15, 2020

(54) IMAGE PROCESSING SYSTEM FOR DETECTING STATIONARY STATE OF MOVING OBJECT FROM IMAGE, IMAGE PROCESSING METHOD, AND RECORDING MEDIUM

(71) Applicant: NEC Corporation, Tokyo (JP)

(72) Inventor: Yukie Ebiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/277,190

(22) Filed: Feb. 15, 2019

(65) Prior Publication Data

US 2019/0180450 A1    Jun. 13, 2019

Related U.S. Application Data

(63) Continuation of application No. 15/501,673, filed as application No. PCT/JP2015/003780 on Jul. 28, 2015, now Pat. No. 10,262,421.

(30) Foreign Application Priority Data

Aug. 4, 2014    (JP) .................................. 2014-159045

(51) Int. Cl.
*G06K 9/00*    (2006.01)
*G06T 7/246*   (2017.01)
(Continued)

(52) U.S. Cl.
CPC .............. *G06T 7/246* (2017.01); *G06T 7/11* (2017.01); *G06T 7/194* (2017.01); *G06T 7/215* (2017.01);
(Continued)

(58) Field of Classification Search
CPC . G06T 7/246; G06T 7/11; G06T 7/194; G06T 7/215; G06T 7/174; G06T 7/20;
(Continued)

(56) References Cited

U.S. PATENT DOCUMENTS

| | | |
|---|---|---|
| 2002/0168091 A1 | 11/2002 | Trajkovic |
| 2004/0028259 A1 | 2/2004 | Kondo et al. |
| 2004/0061795 A1 | 4/2004 | Kondo et al. |
| 2004/0075749 A1* | 4/2004 | Kondo ................. H04N 21/222 348/222.1 |

(Continued)

FOREIGN PATENT DOCUMENTS

| | | |
|---|---|---|
| JP | 5058010 | 10/2008 |
| JP | 2009-26223 | 2/2009 |

(Continued)

OTHER PUBLICATIONS

International Search Report and Written Opinion dated Oct. 13, 2015, in corresponding PCT International Application.

*Primary Examiner* — Jose L Couso
(74) *Attorney, Agent, or Firm* — Finnegan, Henderson, Farabow, Garrett & Dunner, L.L.P.

(57) ABSTRACT

In order to detect retention in a preferable manner, an image processing system is provided with: a retention area extraction unit that determines whether an area is a retention area in an image frame of a processing time on the basis of a first image generated from each of image frames taken within a first time width from the processing time and a second image generated from each of image frames taken within a second time width from the processing time which is longer than the first time width; and a reliability calculation unit that generates reliability information relating to the determination of the retention area for each area in the image frames to be processed.

12 Claims, 8 Drawing Sheets

(51) Int. Cl.
*H04N 7/18* (2006.01)
*G06T 7/215* (2017.01)
*G06T 7/194* (2017.01)
*G06T 7/11* (2017.01)

(52) U.S. Cl.
CPC ... *H04N 7/188* (2013.01); *G06T 2207/10016* (2013.01); *G06T 2207/20021* (2013.01); *G06T 2207/30232* (2013.01)

(58) Field of Classification Search
CPC . G06T 2207/10016; G06T 2207/20021; G06T 2207/22076; G06T 2207/30232; G06K 9/46; G06K 9/00771; G06K 9/00765; G06K 9/6202; G08B 13/196; G08B 13/19602; G08B 13/19604; G08B 13/19606; G08B 13/19608; H04N 5/145; H04N 19/51; H04N 7/18
See application file for complete search history.

(56) References Cited

U.S. PATENT DOCUMENTS

| | | |
|---|---|---|
| 2005/0036658 A1 | 2/2005 | Gibbins et al. |
| 2008/0037869 A1 | 2/2008 | Zhou |
| 2013/0188826 A1 | 7/2013 | Nishino |
| 2015/0138322 A1 | 5/2015 | Kawamura |
| 2015/0213318 A1 | 7/2015 | Einecke et al. |
| 2018/0048817 A1 | 2/2018 | Dong et al. |

FOREIGN PATENT DOCUMENTS

| | | |
|---|---|---|
| JP | 2009-230759 | 10/2009 |
| JP | 2010-15469 | 1/2010 |
| JP | 2012-173987 | 9/2012 |
| JP | 2012-191547 | 10/2012 |
| JP | 2012-212238 | 11/2012 |
| JP | 2013-33317 | 2/2013 |
| JP | 2013-65151 | 4/2013 |
| WO | WO 2009/125569 A1 | 10/2009 |

\* cited by examiner

IMAGE PROCESSING SYSTEM FOR DETECTING STATIONARY STATE OF MOVING OBJECT FROM IMAGE, IMAGE PROCESSING METHOD, AND RECORDING MEDIUM

CROSS-REFERENCE TO RELATED PATENT APPLICATIONS

This application is a continuation of U.S. patent application Ser. No. 15/501,673, filed Feb. 3, 2017, which is a National Stage Entry of International Application No. PCT/JP2015/003780, filed Jul. 28, 2015, which claims priority from Japanese Patent Application No. 2014-159045, filed Aug. 4, 2014. The entire contents of the above-referenced applications are expressly incorporated herein by reference.

TECHNICAL FIELD

Some example embodiments according to the present invention relate to an image processing system, an image processing method and a recording medium.

BACKGROUND ART

In video surveillance, for example, identifying a left-behind object and a person who stays in a place for a period of time longer than a certain time has been considered in recent years (see PTL 1, for example). In PTL 1, motion in a scene is analyzed at multiple time scales and long-term and short-term background models are compared with one another. This is used to differentiate among pixels that belong to primarily static background portions of the scene, pixels that belong to the active foreground portions, and pixels that belong to a left-behind object which has been static for some amount of time.

PTL 2 to PTL 6 also discloses related art.

CITATION LIST

Patent Literature

PTL 1: Japanese Patent Publication No. 5058010
PTL 2: International Publication No. WO 2009/125569
PTL 3: Japanese Laid-open Patent Publication No. 2013-065151
PTL 4: Japanese Laid-open Patent Publication No. 2012-212238
PTL 5: Japanese Laid-open Patent Publication No. 2010-015469
PTL 6: Japanese Laid-open Patent Publication No. 2009-230759

SUMMARY OF INVENTION

Technical Problem

In the approach described in PTL 1, when a flow of dense moving objects (for example a flow of people) occurs, the flow of the moving objects blends into the background. A flow of moving objects blends into the background differently between a long-term background model and a short-term background model, which results in noises. It is therefore difficult to properly detect a left-behind object by comparing the long-term background model and the short-term background model.

Some aspects of the present invention have been made in light of the problems described above and one of the objects of the present invention is to provide an image processing system, an image processing method and a recording medium for properly detecting a stationary state.

Solution to Problem

An image processing system according to one aspect of the present invention includes: determining means for determining whether or not a region is a stationary region in an image frame at the time of processing, based on a first image generated from each image frame captured in a first time period from the time of the processing and a second image generated from each image frame captured in a second time period from the time of the processing, the second time period being longer than the first time period; and generation means for generating reliability information about determination as to whether or not each region in an image frame being processed is the stationary region.

An image processing method according to one aspect of the present invention includes: determining whether or not a region is a stationary region in an image frame at the time of processing, based on a first image generated from each image frame captured in a first time period from the time of the processing and a second image generated from each image frame captured in a second time period from the time of the processing, the second time period being longer than the first time period; and generating reliability information about determination as to whether or not each region in an image being processed is the stationary region.

A computer-readable non-transitory recording medium according to the present invention stores a program which causes a computer to execute the processes of: determining whether or not a region is a stationary region in an image frame at the time of processing, based on a first image generated from each image frame captured in a first time period from the time of the processing and a second image generated from each image frame captured in a second time period from the time of the processing, the second time period being longer than the first time period; and generating reliability information about determination as to whether or not each region in an image frame being processed is the stationary region.

The terms "unit", "means", "device" and "system" as used in the present invention mean not only physical means but also encompasses software implementations of functions of the "unit", "means", "device" and "system". Further, functions of a single "unit", "means" "device" and "system" may be implemented by more than one physical means or device; or functions of more than one "unit", "means", "device" and "system" may be implemented by a single physical means or device.

Advantageous Effects of Invention

According to the present invention, an image processing system, an image processing method and a program for properly detecting a stationary state can be provided.

EXAMPLE EMBODIMENT

Figure 1:
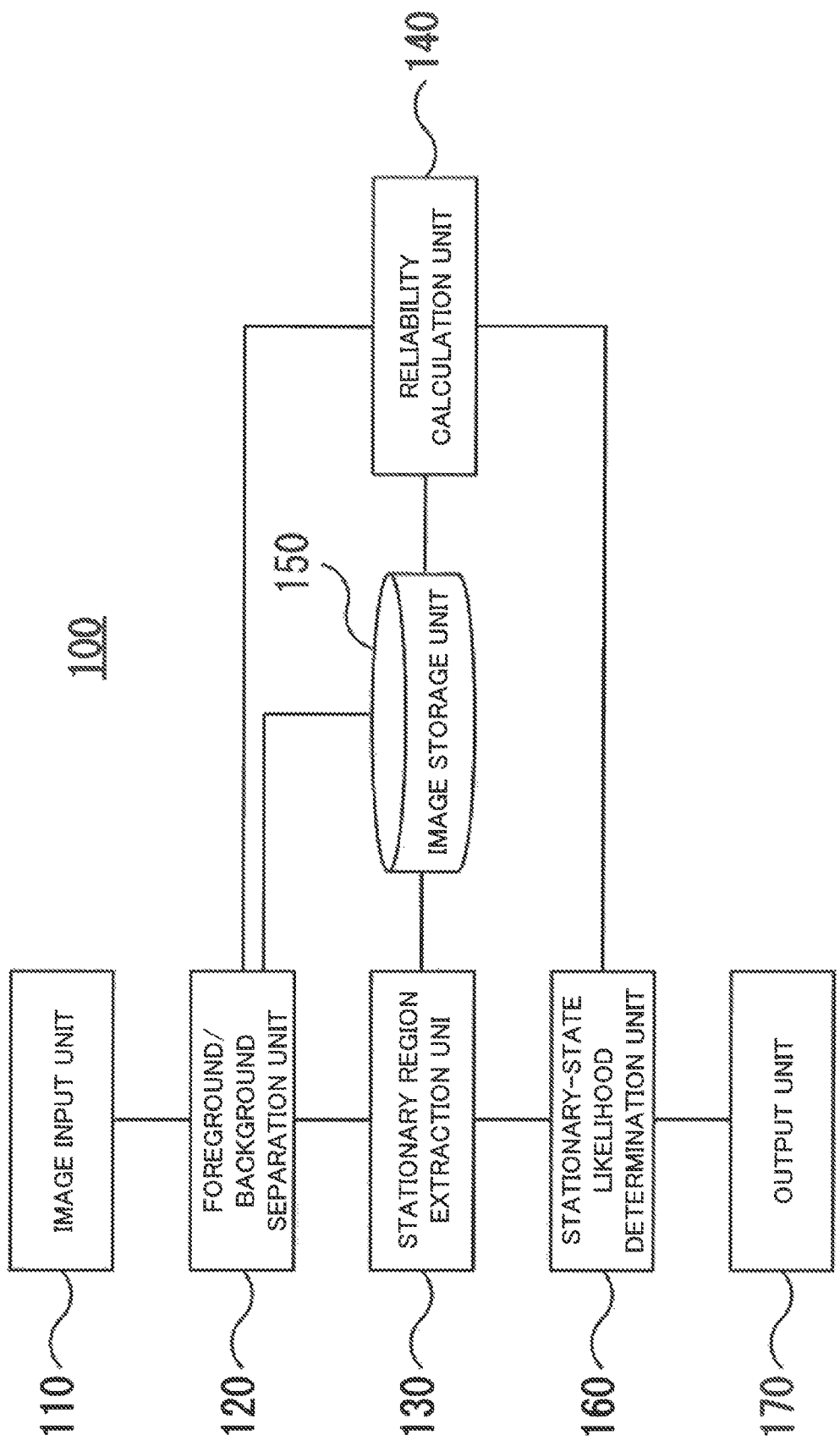
FIG. 1 is a functional block diagram schematically illustrating a configuration of an image processing system according to a first example embodiment.

Example embodiments of the present invention will be described below. Identical or similar components are respectively given identical or similar reference numerals in the following description and referenced drawings.

1 First Example Embodiment

FIGS. 1 to 7 are diagrams for explaining a first example embodiment. The present example embodiment will be described in the following order with reference to the drawings. First, section "1.1" gives an overview of a stationary state determination method according to the first example embodiment. Then, section "1.2" gives an overview of a functional configuration of an image processing system according to the present example embodiment and section "1.3" describes a flow of processing. Section "1.4" describes a specific example of a hardware configuration capable of implementing the image processing system. Lastly, section "1.5" and subsequent sections describe advantageous effects of the present example embodiment and other subjects.

1.1 Overview

An image processing system according to the present example embodiment is intended to detect a stationary state of a moving object from images captured by a surveillance camera or the like, for example. The moving objects the image processing system detects a stationary state thereof may include, for example, persons, animals, vehicles or the like which move on their own, objects left behind by persons, and the like. The description here will mainly focus on detection of a stationary state of a person.

A conceivable approach to detecting a stationary object may be as follows, for example. First, many images captured in a long term (hereinafter also referred to as a long-term time window) are averaged or otherwise to generate a background image. The background image is compared with a background image obtained by averaging the respective images captured in a shorter term (hereinafter also referred to as a short-term time window) to extract an object staying in images for a long time within the short term. By generating average images (background images) from images captured in a certain period of time in this way, influence of moving objects (including persons) and the like that quickly move out of frame can be minimized in the images, for example and therefore a stationary object can be readily extracted. Note that an image in which the influence of moving objects is minimized by being generated from a plurality of images will be referred to as a background image in the present example embodiment.

However, in cases where movement of moving objects, for example a flow of people constantly occurs, the approach leaves influence of a flow of people significantly in an image generated by averaging captured images. Accordingly, the flow of people blends into the background differently between a long-term time window image and a short-term time window image, and as a result, failure of detection of a static object and false detection tend to occur.

To address this, the image processing system according to the present example embodiment calculates the degree of reliability of stationary-state detection for each region in an image. By using a method of excluding portions with low degrees of reliability from determination of a stationary sate and the like, false detection of a stationary state can be minimized.

1.2. System Overview

A system configuration of the image processing system 100 according to the present example embodiment will be described below with reference to FIG. 1. FIG. 1 is a block diagram illustrating a system configuration of the image processing system 100.

The image processing system 100 includes an image input unit 110, a foreground/background separation unit 120, a stationary region extraction unit 130, a reliability calculation unit 140, an image storage unit 150, a stationary-state likelihood determination unit 160, and an output unit 170.

The image input unit 110 receives an input of time-series frame images contained in video input from an imaging apparatus such as a surveillance camera, not depicted. The respective frame images are images captured at different times. Alternatively, the image input unit 110 may receive an input of frame images obtained by decoding video data stored on a hard disk drive (HDD) or a video cassette recorder (VCR), not depicted.

The foreground/background separation unit 120 sequentially separates each of input images input from the image input unit 110 into a foreground region and background region by using a background difference method, an optical flow, or the like, for example.

The foreground region is a dynamic region in an image and the background region is a motionless (static) region (hereinafter also referred to as a static region). Determination as to whether or not motion is present can be made based on whether or not the amount of motion exceeds a threshold, for example. The threshold used for the determination as to whether or not motion is present may be changed depending on the type of a moving object in a stationary state to be detected. Specifically, if a rigid object such as a left-behind suitcase is to be detected, a region in which there is no motion in images may be determined to be a background region and the other regions may be determined to be foreground regions. On the other hand, if a non-rigid object such as a person or a bag is to be detected, a region in which a change in appearance occur in an image due to a slight shaking, a change in attitude or a change in shape but the amount of change is smaller than a predetermined threshold is determined to be substantially statistic and therefore to be a background region, and the other regions may be determined to be foreground regions. The other regions are regions that have amounts of change greater than the threshold. In other words, the term background region refers to not only a completely motionless region but also a region that has an amount of motion smaller than a threshold.

In an approach that uses optical flow to separate a dynamic, foreground region and a static, background region, an image frame being processed is compared with a previous image frame in a macroblock unit to identify a dynamic block, for example. More specifically, a dynamic block can be identified by checking where a macroblock (a set of pixels) similar to each macroblock in an image frame being processed is located in the previous image frame (block matching), for example.

If background difference method is used, a foreground region and a background region can be separated by determining whether or not a difference between a background image acquired previously and an image being processed exceeds a threshold by comparison on a pixel-by-pixel basis or on a pixel-set-by-pixel-set basis, such as macroblock by macroblock.

The stationary region extraction unit 130 generates a plurality of background images from image frames included in a plurality of time windows and compares the background images with one another to determine a stationary region.

Figure 2:
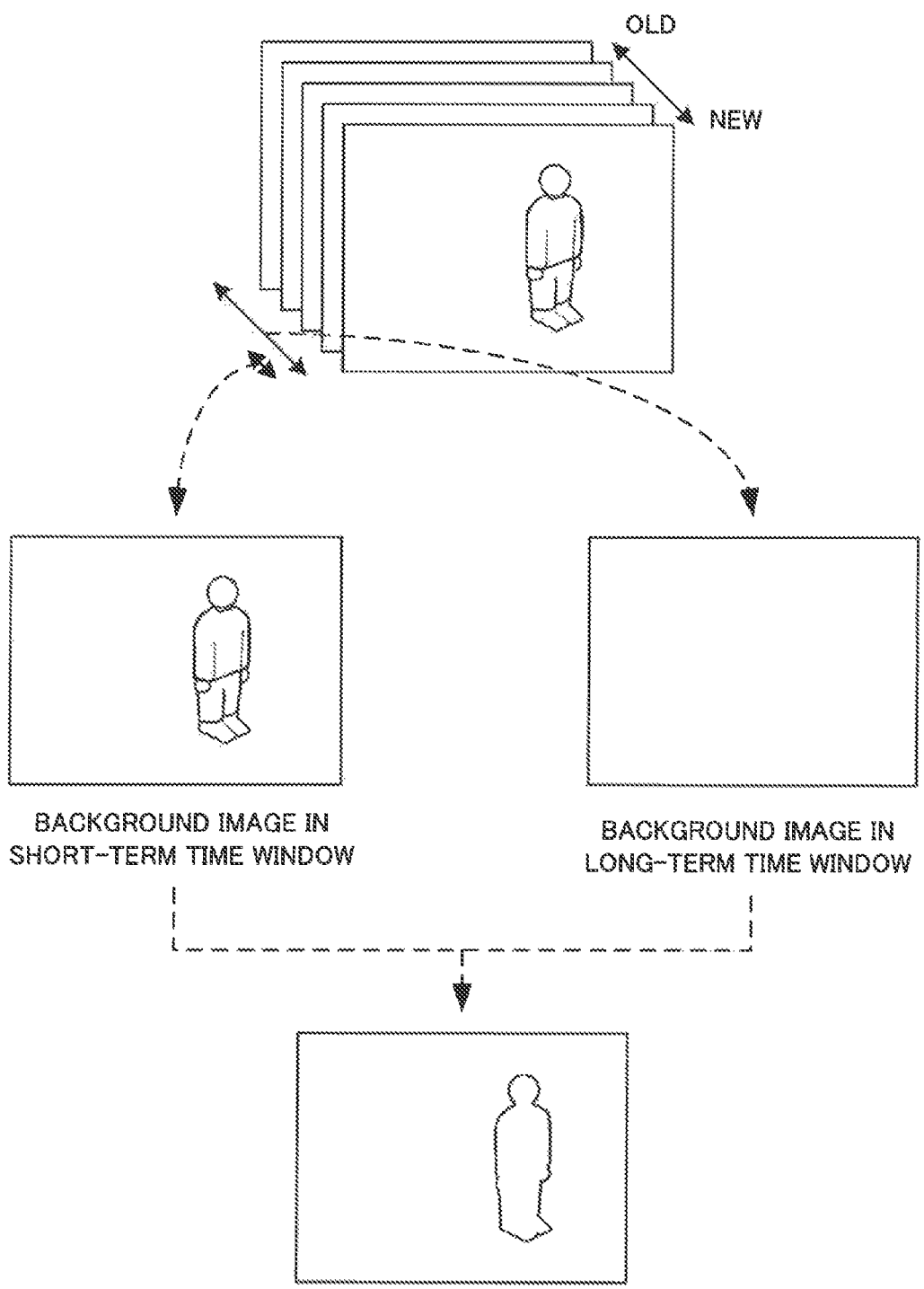
FIG. 2 is a diagram illustrating a specific example of a method for generating a background image.

A specific example of a method for determining a stationary region performed by the stationary region extraction unit 130 will be described below with reference to FIG. 2. As illustrated in FIG. 2, for example, the stationary region extraction unit 130 generates a background image in each of a plurality of time windows from each image frame from which only a background region is extracted. The background images can be generated, for example, by obtaining the average, median, mode value or the like of pixel values for each pixel in the image frames, in a static region in each of the image frames captured in a certain past period of time from the time of processing. By generating a background image for a short-term time window and a background image for a long-term time window, the image processing system can compare the background images to extract pixels with differences greater than a threshold, thereby can identify a pixel region made up of the pixels as a stationary region in which a moving object is stationary.

While only two background images, i.e. a background image in a short-term time window and a background image in a long-term time window, are depicted in the example in FIG. 2, background images in three or more time windows may be generated depending on the stationary time of a moving object to be detected that is stationary.

Figure 3:
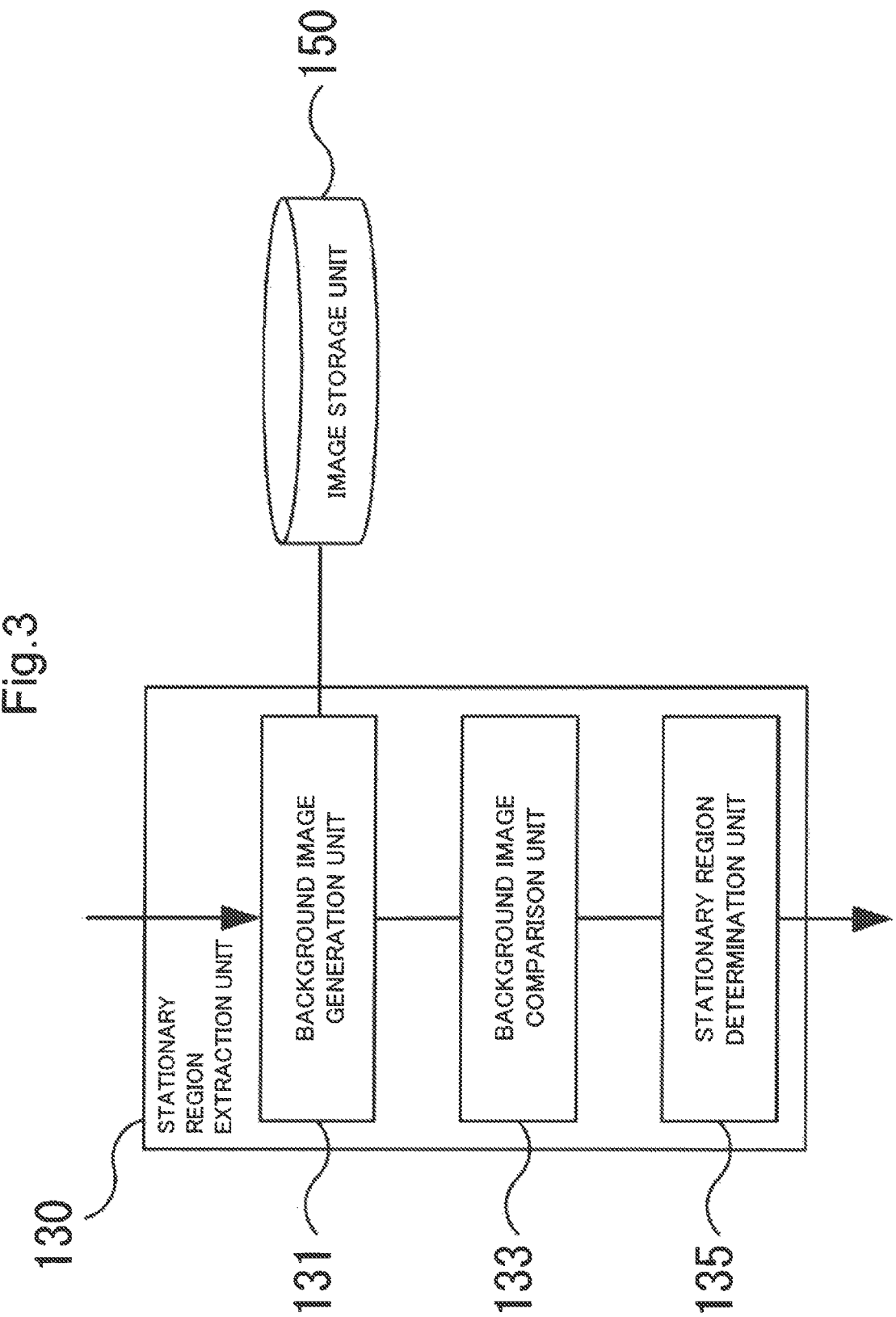
FIG. 3 is a functional block diagram schematically illustrating a specific example of a configuration of a static region extraction unit.

FIG. 3 illustrates a specific example of a functional configuration of the stationary region extraction unit 130. In the example in FIG. 3, the stationary region extraction unit 130 includes a background image generation unit 131, a background image comparison unit 133, and a stationary region determination unit 135.

The background image generation unit 131 generates a background image by using a background region (an image of a static region) extracted by the foreground/background separation unit 120 and background regions associated with image frames captured in a plurality of predetermined time windows and stored in the image storage unit 150. In this case, the background image generation unit 131 can generate a background image by calculating the average, median or mode value of pixel values in the time windows obtained at respective pixel positions associated with the background region in each of the image frames.

The image storage unit 150 stores images associated with background regions in respective input images extracted one by one by the foreground/background separation unit 120 in a predetermined period of time.

The background image comparison unit 133 compares background images generated in time windows by the background image generation unit 131 with one another. More specifically, the background image comparison unit 133 compares a background image generated from the longest time window with a background image generated from a shorter time window to detect a stationary region in which a moving object is static for a given period of time. The background image generated from the longest time window is a background image assumed to be composed of a true background that does not include a moving object. The background image comparison unit 133 may detect a stationary region by generating background images from backgrounds in a plurality of time windows and classifying the background images according to the duration of a static state.

The background image comparison unit 133 may compare background images, for example, by a method that uses the absolute value of a difference in pixel value between the background images or a method that calculates a correlation between pixel values in a rectangular region of small size while scanning the rectangular regions on an image. Alternatively, the background image comparison unit 133 may also compare background images by using a method that calculates the histogram distance between pixel values in a rectangular region, for example. For the method using a rectangular region, a predetermined size such as a macroblock may be set. For a method that uses a rectangular region, different sizes may be set for different locations in an image frame by using a camera parameter and taking into consideration what size a moving object to be detected appears in the image frame. One way to set different sizes in different locations in an image frame may be to set a larger rectangular region in an image region in which the foreside of a scene appears and set a smaller rectangular region in an image area in which the rear side of the scene appears, for example.

The stationary region determination unit 135 identifies pixels with differences greater than a threshold as a result of comparison by the background image comparison unit 133 and determines a pixel region made up of such pixels as a stationary region, for example. In this case, if features such as the size and shape of an object to be detected are known, the stationary region determination unit 135 may make the determination excluding a pixel region that does not match the features.

Referring back to FIG. 1, the reliability calculation unit 140 calculates the degree of reliability of stationary-state detection in each region (including the case of being each pixel) in an image frame being processed. There may be various methods for calculating the degree of reliability. For example, for each image frame included in a time window used for generating the background image described above, the ratio at which each pixel or each set of pixels such as macroblock has been determined to be a background by the foreground/background separation unit 120 may be calculated for each pixel or each set of pixels such as macroblock and the ratio may be used as the degree of reliability of the time window. The ratio at which a pixel or a set of pixels has been determined to be background will be hereinafter also referred to as the background-pixel acquisition ratio. The background-pixel acquisition ratio is lowered in a region in which the background rapidly changes, such as a region in which a flow of moving objects constantly occurs, and therefore it is difficult to properly detect a stationary state from the background image. The reliability calculation unit 140 may set a low degree of reliability for such a region. The degree of reliability may be calculated for each of time windows used for generating a plurality of background images respectively.

The reliability calculation unit 140 may calculate the background-pixel acquisition ratio for each time window and then calculate the degree of reliability by taking into consideration the background-pixel acquisition ratios. More specifically, for example, when the background-pixel acquisition ratios are low in all of the time windows for which the degree of reliability has been calculated, the region may be a region from which background pixels are always unlikely to be acquired. The reliability calculation unit 140 may set a low degree of reliability for such a region.

The reliability calculation unit 140 may calculate the degree of reliability by using environmental changes. A case will be described in which the reliability calculation unit 140 receives an input of environmental information such as day of week (for example a weekday, weekend, or the like), time, location, weather or the like which can change a background. In this case, the reliability calculation unit 140 may statistically calculate the degree of reliability depending on environmental conditions obtained from such environmental information, or by taking into consideration the background-pixel acquisition ratio.

Based on the result of stationary-state determination for each region (including a case of being each pixel) made by the stationary region extraction unit 130 and on the degree of reliability calculated by the reliability calculation unit 140, the stationary-state likelihood determination unit 160 determines whether or not each region is stationary, or determines the likelihood of each region being stationary. The stationary-state likelihood determination unit 160 may not output the result of the stationary-state detection for a region with a degree of reliability lower than a threshold (may exclude the region from the determination), for example. In this case, for a region with a degree of reliability higher than the threshold, the stationary-state likelihood determination unit 160 may output the detection result of stationary region/non-stationary region, which is the result of the stationary-state determination made by the stationary region extraction unit 130.

When the degree of reliability of a region is lower than the threshold but only the degree of reliability in a short-term time window is low and the degrees of reliability in other time windows such as a long-term time window are high, it is assumed that a moving object in a stationary state is likely to be hidden behind another moving object for a short time, for example. The stationary-state likelihood determination unit 160 may identify such a region as a region likely to be stationary.

A case will be described in which even when the degree of reliability of a region subjected to the determination processing (a region being processed) is low, a stationary state has been detected in a region spatially close to the region being processed or in a corresponding region in a close image frame (a temporally close region). In this case, the stationary-state likelihood determination unit 160 may identify the region being processed is likely to be stationary.

The output unit 170 outputs, the results of determinations made by the stationary-state likelihood determination unit 160 that a stationary state has occurred in a region, or that a stationary state has not occurred in a region, or that a stationary state is likely to have occurred in a region, to a display device, a storage medium or another information processing device, for example.

1.3 Process Flow

Figure 4:
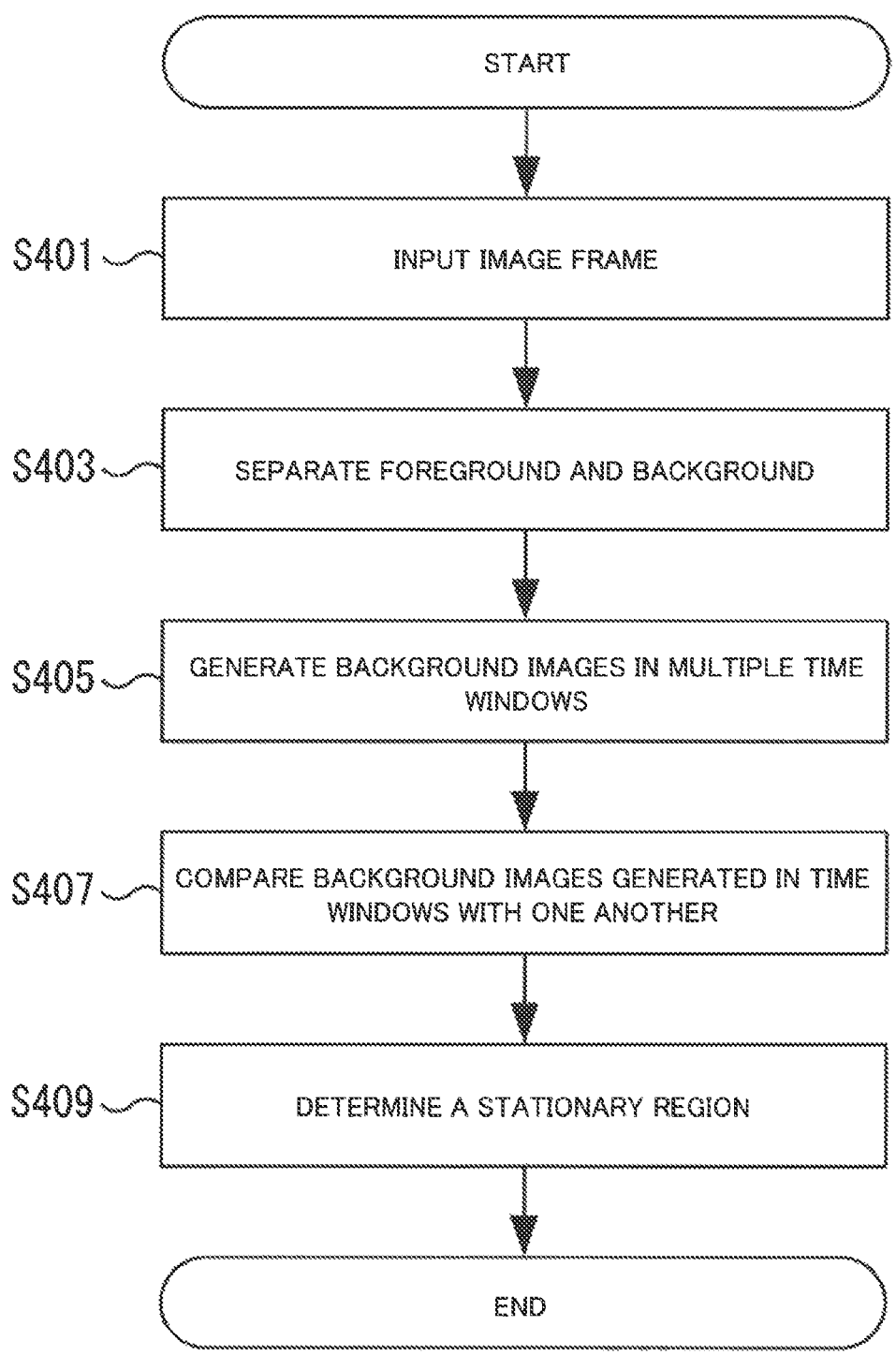
FIG. 4 is a flowchart illustrating a flow of processing in the image processing system illustrated in FIG. 1.
Figure 5:
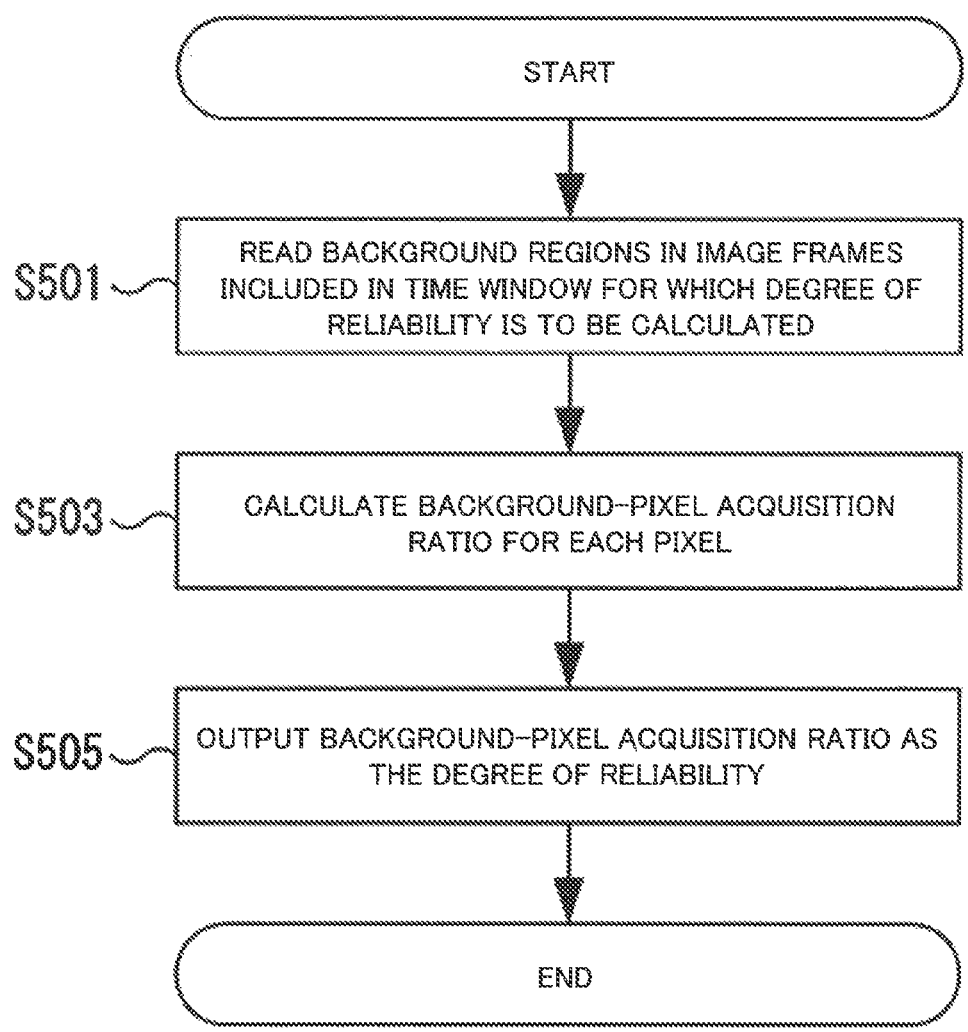
FIG. 5 is a flowchart illustrating a flow of processing in the image processing system illustrated in FIG. 1.

A flow of process in the image processing system 100 will be described below with reference to FIGS. 4 to 6.

Steps of the process described below can be executed in a different order or in parallel as appropriate, or another step may be added between the steps unless inconsistency occurs in the processing details. Further, a step that is conveniently illustrated as a single step may be executed dividing the step into multiple steps, or steps conveniently illustrated as being separate steps may be executed as a single step.

(1.3.1 Flow of Processing for Identifying Stationary Region by the Stationary Region Extraction Unit 130)

A flow of processing for identifying a stationary region performed by the stationary region extraction unit 130 will be described first with reference to FIG. 4.

The image input unit 110 receives an input of an image frame of video captured by a video camera or an image frame obtained by decoding video data in which the video is recorded, for example (S401).

The foreground/background separation unit 120 separates the image frame input from the image input unit 110 into a static, background region and a dynamic, foreground region (S403). The generated background region image is stored in the image storage unit 150, for example.

The background image generation unit 131 uses a background region identified by the foreground/background separation unit 120 in each image captured in a predetermined time window to generate a background image (S405). In this case, the background image generation unit 131 generates background images in a plurality of time windows depending on the stationary time of a moving object for which a stationary state is to be extracted.

The background image comparison unit 133 compares respective background images in the time windows generated by the background image generation unit 131 with one another (S407) and the stationary region determination unit 135 identifies a region with a difference greater than a threshold as a stationary region (S409).

(1.3.2 Flow of Processing for Calculation of Reliability)

A flow of processing for calculating the degree of reliability performed by the reliability calculation unit 140 will be described next with reference to FIG. 5. Note that a case in which the reliability calculation unit 140 generates the degree of reliability based on the background-pixel acquisition ratio independently of environmental conditions will be described here.

The reliability calculation unit 140 reads background regions in the image frames included in the time windows for which the degrees of reliability is to be calculated from the image storage unit 150 (S501). The background region in each image frame is identified by the foreground/background separation unit 120 as described above.

The reliability calculation unit 140 calculates, for each pixel, the ratio of an acquired background region (background-pixel acquisition ratio) to each of the image frames included in the time window (S503). The reliability calculation unit 140 outputs the background-pixel acquisition ratio to the stationary-state likelihood determination unit 160 as the degree of reliability (S505).

(1.3.3 Flow of Processing for Determining Stationary-State Likelihood)

A method for determining a stationary state by the stationary-state likelihood determination unit 160 will be described with reference to FIG. 6.

Figure 6:
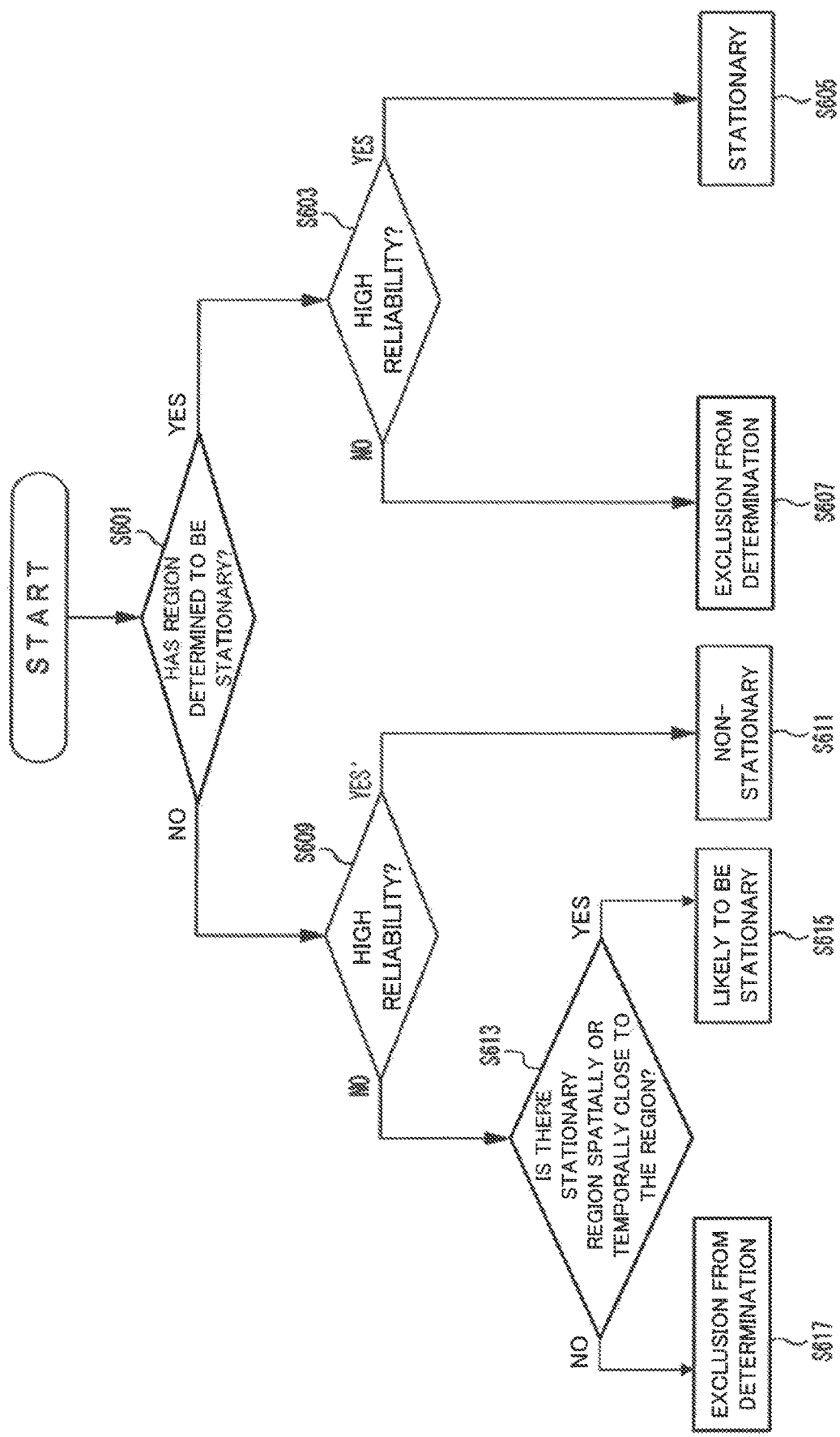
FIG. 6 is a flowchart illustrating a flow of processing in the image processing system illustrated in FIG. 1.

The stationary-state likelihood determination unit 160 determines whether or not each pixel or each set of pixels (hereinafter a pixel or a set of pixels will be collectively referred to as a region) is a stationary region as illustrated in FIG. 6.

First, the stationary-state likelihood determination unit 160 determines whether or not a region for which stationary-state determination is to be made (a region being processed) has been determined to be a stationary region by the stationary region extraction unit 130 (S601). If the region is determined to be a stationary region (YES at step S601), the stationary-state likelihood determination unit 160 determines whether or not the degree of reliability of the determination to be a stationary region calculated by the reliability calculation unit 140, is higher than a threshold (S603). If the degree of reliability is higher than the threshold (YES at S603), the stationary-state likelihood determination unit 160 determines that the region is stationary (S605).

If the degree of reliability of the region being processed is less than or equal to the threshold (NO at S603), the stationary-state likelihood determination unit 160 determines that the degree of reliability of the result of the determination is low even though the region is determined to be stationary by the stationary region extraction unit 130, and excludes the region from the stationary-state determination (S607).

If it is determined at step S601 that the region being processed is not a stationary region at step S601 (NO at step S601), the stationary-state likelihood determination unit 160 performs processing similar to the processing at S603. Specifically, the stationary-state likelihood determination unit 106 determines whether or not the degree of reliability of the determination that the region is stationary calculated by the reliability calculation unit 140 is higher than a threshold (S609). If the degree of reliability is higher than the threshold (YES at step S609), the stationary-state likelihood determination unit 160 determines that the region is not stationary (S611).

On the other hand, if the degree of reliability is less than or equal to the threshold (NO at S609), the stationary-state likelihood determination unit 160 determines whether or not a region spatially or temporally close to the region being processed has been determined to be stationary (S613). The temporally close region is a region in a location corresponding to that of the region being processed in a temporally close image frame. If a temporality or spatially close region has been determined to be stationary (YES at S613), the stationary-state likelihood determination unit 160 determines that the region is likely to be stationary and may output the region in distinction from stationary and non-stationary regions (S615). If a temporally or spatially close region has not been determined to be stationary (NO at S613), the stationary likelihood determination unit 160 excludes the region from the determination (S617).

1.4 Hardware Configuration

An example of hardware configuration for implementing the image processing system 100 described above by a computer will be described below with reference to FIG. 7. As noted previously, the functions of the image processing system 100 may be implemented by a plurality of information processing devices.

Figure 7:
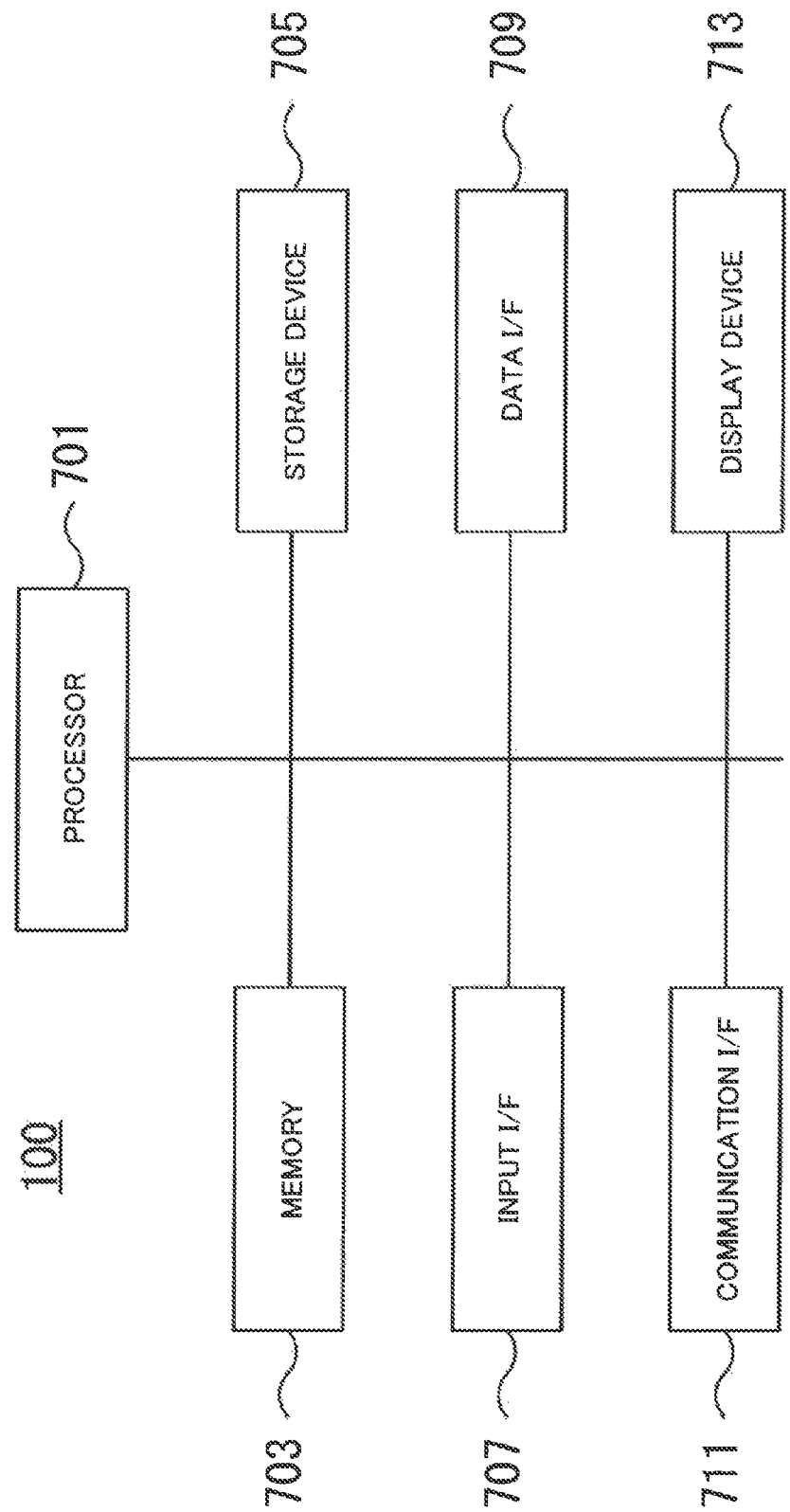
FIG. 7 is a block diagram illustrating a hardware configuration capable of implementing the image processing system illustrated in FIG. 1.

As illustrated in FIG. 7, the image processing system 100 includes a processor 701, a memory 703, a storage device 705, an input interface (I/F) 707, a data I/F 709, a communication I/F 711, and a display device 713.

The processor 701 controls various processes in the image processing system 100 by executing programs stored in the memory 703. For example, processes relating to the image input unit 110, the foreground/background separation unit 120, the stationary region extraction unit 130, the reliability calculation unit 140, the stationary-state likelihood determination unit 160 and the output unit 170 can be implemented as a program temporarily stored in the memory 703 and then operated primarily on the processor 701.

The memory 703 is a storage medium such as a random access memory (RAM). The memory 703 temporarily stores program code of a program executed by the processor 701 and data required during execution of the program. For example, a stack area required during execution of the program is reserved in the memory area in the memory 703.

The storage device 705 is a nonvolatile storage medium such as a hard disk or a flash memory, for example. The storage device 705 stores an operating system, various kinds of programs for implementing the image input unit 110, the foreground/background separation unit 120, the stationary region extraction unit 130, the reliability calculation unit 140, the stationary-state likelihood determination unit 160, and the output unit 170, and various kinds of data including the image storage unit 150. The programs and data stored in the storage device 705 are loaded into the memory 703 as necessary and accessed by the processor 701.

The input I/F 707 is a device for accepting inputs from a user. Examples of the input I/F 707 include a keyboard, a mouse, a touch panel and the like. The input I/F 707 may be connected to the image processing system 100 via an interface such as a universal serial bus (USB), for example.

The data I/F 709 is a device for inputting data from outside the image processing system 100. Examples of the data I/F 709 include drive devices for reading data stored on various storage media and the like. The data I/F 709 may be provided outside the image processing system 100. In that case, the data I/F 709 is connected to the image processing system 100 via an interface such as a USB, for example.

The communication I/F 711 is a device for providing data communication with devices external to the image processing system 100, for example, a video camera and the like, via wire or wirelessly. The communication I/F 711 may be provided outside the image processing system 100. In that case, the communication I/F 711 is connected to the image processing system 100 via an interface such as a USB, for example.

The display device 713 is a device for displaying various kinds of information. Examples of the display device 713 include a liquid-crystal display, an electro-luminescence (EL) display and the like, for example. The display device 713 may be provided outside the image processing system 100. In that case, the display device 713 is connected to the image processing system 100 via a display cable or the like, for example.

1.5 Advantageous Effects of the Present Example Embodiment

As described above, the image processing system 100 according to the present example embodiment not only makes stationary-state determination but also calculates the degree of reliability of the stationary-state determination. By using the degree of reliability for the stationary-state determination, false detection of a stationary state can be reduced and lost or discontinuous stationary regions can be complemented, for example. Thus, the accuracy of the stationary-state detection can be improved.

Further, the result of the stationary-state detection can be used to detect suspicious persons (loiterers, stationing persons, ambushing persons, persons sleeping on the street, and the like) and suspicious objects for the purpose of security. In addition, stationary-state information about customers at each of the shelves (staying time, frequency, and the like) can be collected for the purpose of marketing.

2 Second Example Embodiment

Figure 8:
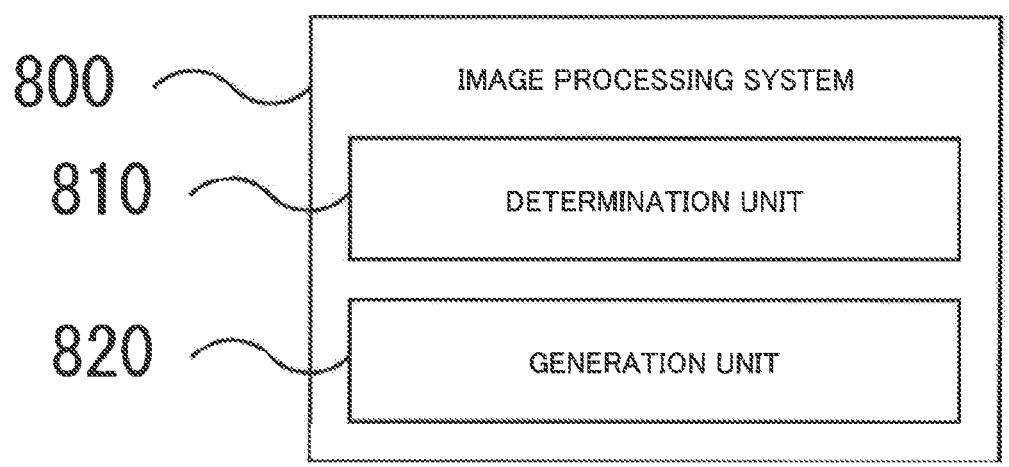
FIG. 8 is a functional block diagram schematically illustrating a configuration of an image processing system according to a second example embodiment.

A second example embodiment will be described below with reference to FIG. 8. FIG. 8 is a block diagram illustrating a functional configuration of an image processing system 800. As illustrated in FIG. 8, the image processing system 800 includes a determination unit 810 and a generation unit 820.

Based on a first image generated from each of image frames captured in a first time period from the time of processing and a second image generated from each of image frames captured in a second time period from the time of the processing, the determination unit 810 determines whether or not a region is a stationary region in an image frame at the time of processing. Here, the first time period is a short-term time window and the second time period is a long-term time window described in FIG. 2, for example. The first time period and the second time period are different from each other. The first image and the second image are background images in the respective time periods, for example.

The generation unit 820 generates reliability information about determination as to whether or not each region in an image frame being processed is a stationary region.

The image processing system 800 according to the example embodiment implemented as described above enables proper detection of a stationary state.

3 Additional Matters

Some of the components of the configurations of the example embodiments described above may be combined or replaced. Further, the configuration of the present invention is not limited to the example embodiments described above; various modifications can be made without departing from the spirit of the present invention.

Some or all of the example embodiments described above can be also described as, but not limited to, the following supplementary notes. A program of the present invention may be a program for causing a computer to execute the respective operations described in the example embodiments.

(Supplementary Note 1)

An image processing system including: determining means for determining whether or not a region is a stationary region in an image frame at the time of processing, based on a first image generated from each image frame captured in a first time period from the time of the processing and a second image generated from each image frame captured in a second time period from the time of the processing, the second time period being longer than the first time period; and generation means for generating reliability information about determination as to whether or not each region in an image frame being processed is the stationary region.

(Supplementary Note 2)

The image processing system according to Supplementary Note 1, wherein the generation means generates, for each region in the image frame being processed, the reliability information based on a ratio at which a corresponding region in each image frame captured in the first time period is a static region.

(Supplementary Note 3)

The image processing system according to Supplementary Note 1 or 2, wherein the generation means generates the reliability information in accordance with an environmental condition.

(Supplementary Note 4)

The image processing system according to any one of Supplementary Notes 1 to 3, further including means for, based on the reliability information, including or excluding each region in the image frame being processed into or from the determination as to whether or not the region is the stationary region.

(Supplementary Note 5)

The image processing system according to Supplementary Note 4, further including means for, when the reliability information of a region being processed is lower than a threshold and a region spatially close to the region being processed or a corresponding region in an image frame temporally close to an image frame at the time of the processing is the stationary region, determining the region being processed to be a region likely to be stationary.

(Supplementary Note 6)

An image processing method including: a step of determining whether or not a region is a stationary region in an image frame at the time of processing, based on a first image generated from each image frame captured in a first time period from the time of the processing and a second image generated from each image frame captured in a second time period from the time of the processing, the second time period being longer than the first time period; and a step of generating reliability information about determination as to whether or not each region in an image being processed is the stationary region.

(Supplementary Note 7)

The image processing method according to Supplementary Note 7, wherein for each region in the image frame being processed, the reliability information is generated based on a ratio at which a corresponding region in each image frame captured in the first time period is a static region.

(Supplementary Note 8)

The image processing method according to Supplementary Note 6 or 7, wherein the reliability information is generated in accordance with an environmental condition.

(Supplementary Note 9)

The image processing method according to any one of Supplementary Notes 6 to 8, further including means for, based on the reliability information, including or excluding each region in the image frame being processed into or from the determination as to whether or not the region is the stationary region.

(Supplementary Note 10)

The image processing method according to Supplementary Note 9, further including the step of, when the reliability information of a region being processed is lower than a threshold and a region spatially close to the region being processed or a corresponding region in an image frame temporally close to an image frame at the time of processing is the stationary region, determining the region being processed to be a region likely to be stationary.

(Supplementary Note 11)

A program which causes a computer to execute the processes of: determining whether or not a region is a stationary region in an image frame at the time of processing, based on a first image generated from each image frame captured in a first time period from the time of the processing and a second image generated from each image frame captured in a second time period from the time of the processing, the second time period being longer than the first time period; and generating reliability information about determination as to whether or not each region in an image frame being processed is the stationary region.

(Supplementary Note 12)

The program according to Supplementary Note 11, wherein for each region in the image being processed, the reliability information is generated based on a ratio at which a corresponding region in each image frame captured in the first time period is a static region.

(Supplementary Note 13)

The program according to Supplementary Note 11 or 12, wherein the reliability information is generated in accordance with an environmental condition.

(Supplementary Note 14)

The program according to any one of Supplementary Notes 11 to 13, further including means for, based on the reliability information, including or excluding each region in the image frame being processed into or from the determination as to whether or not the region is the stationary region.

(Supplementary Note 15)

The program according to Supplementary Note 14, causing the computer to further execute the process of, when the reliability information of a region being processed is lower than a threshold and a region spatially close to the region being processed or a corresponding region in an image frame temporally close to an image frame at the time of processing is the stationary region, determining the region being processed to be a region likely to be stationary.

This application is based upon and claims the benefit of priority from Japanese Patent Application No. 2014-159045, filed on Aug. 4, 2014, the entire disclosure of which is incorporated herein.

REFERENCE SIGNS LIST

100 Image processing system
110 Image input unit
120 Foreground/background separation unit
130 Stationary region extraction unit
131 Background image generation unit
133 Background image comparison unit
135 Stationary region determination unit
140 Reliability calculation unit
150 Image storage unit
160 Stationary-state likelihood determination unit
170 Output unit
701 Processor
703 Memory
705 Storage device
707 Input interface
709 Data interface
711 Communication interface
713 Display device
800 Image processing system
810 Determination unit
820 Generation unit

The invention claimed is:

1. A stationary-state detection system comprising:
at least one memory storing instructions; and
at least one processor coupled to the at least one memory and configured to execute the instructions to:
generate a first image based on a plurality of image frames captured in a first time period starting from a time of processing and generate a second image based on a plurality of image frames captured in a second time period starting from the time of processing, the second time period being longer than the first time period;
extract one or more stationary regions from an image frame at the time of processing, based on the first image and the second image, a stationary region being a region in which a moving object is stationary;
generate reliability information as to the extraction for each region in the image frame at the time of processing;
perform determination of whether a target region in the image frame at the time of processing is a stationary region, non-stationary region or a region likely to be a stationary region, based on the reliability information; and
output the region determined to be a region likely to be a stationary region in distinction from both the region determined to be a stationary region and the region determined to be a non-stationary region.

2. The stationary-state detection system according to claim 1, wherein the processor is configured to execute the instructions to determine that the target region is a region likely to be a stationary region when the reliability information for the target region does not meet the criterion and a predetermined condition is satisfied, the predetermined condition comprising a condition that a region spatially close to the target region or a corresponding region in an image frame temporally close to the image frame at the time of processing is determined to be a stationary region.

3. The stationary-state detection system according to claim 1, wherein the processor is configured to execute the instructions to determine that the target region is a region likely to be a stationary region when the reliability information for the target region does not meet the criterion and a predetermined condition is satisfied, the predetermined condition comprising a condition that target region is not extracted as a stationary region.

4. The stationary-state detection system according to claim 1, wherein the processor is further configured to generate the reliability information for the target region based on a ratio of stationary regions to regions corresponding to the target region in image frames captured in the first time period.

5. A stationary-state detection method comprising:
generating a first image based on a plurality of image frames captured in a first time period starting from a time of processing and generate a second image based on a plurality of image frames captured in a second time period starting from the time of processing, the second time period being longer than the first time period;
extracting one or more stationary regions from an image frame at the time of processing, based on the first image and the second image, a stationary region being a region in which a moving object is stationary;
generating reliability information as to the extraction for each region in the image frame at the time of processing;
performing determination of whether a target region in the image frame at the time of processing is a stationary region, non-stationary region or a region likely to be a stationary region, based on the reliability information; and
outputting the region determined to be a region likely to be a stationary region in distinction from both the region determined to be a stationary region and the region determined to be a non-stationary region.

6. The stationary-state detection method according to claim 5, wherein the determination comprising determination of that the target region is a region likely to be a stationary region when the reliability information for the target region does not meet the criterion and a predetermined condition is satisfied, the predetermined condition comprising that a region spatially close to the target region or a corresponding region in an image frame temporally close to the image frame at the time of processing is determined to be a stationary region.

7. The stationary-state detection method according to claim 5, wherein the determination comprising determination of that the target region is a region likely to be a stationary region when the reliability information for the target region does not meet the criterion and a predetermined condition is satisfied, the predetermined condition comprising a condition that target region is not extracted as a stationary region.

8. The stationary-state detection method according to claim 5, comprising generating the reliability information for the target region based on a ratio of stationary regions to regions corresponding to the target region in image frames captured in the first time period.

9. A non-transitory computer-readable storage medium storing a program that causes a computer to execute:
generating a first image based on a plurality of image frames captured in a first time period starting from a time of processing and generate a second image based on a plurality of image frames captured in a second time period starting from the time of processing, the second time period being longer than the first time period;
extracting one or more stationary regions from an image frame at the time of processing, based on the first image and the second image, a stationary region being a region in which a moving object is stationary;
generating reliability information as to the extraction for each region in the image frame at the time of processing;
performing determination of whether a target region in the image frame at the time of processing is a stationary region, non-stationary region or a region likely to be a stationary region, based on the reliability information; and
outputting the region determined to be a region likely to be a stationary region in distinction from both the region determined to be a stationary region and the region determined to be a non-stationary region.

10. The storage medium according to claim 9, wherein the determination comprising determination of that the target region is a region likely to be a stationary region when the reliability information for the target region does not meet the criterion and a predetermined condition is satisfied, the predetermined condition comprising that a region spatially close to the target region or a corresponding region in an image frame temporally close to the image frame at the time of processing is determined to be a stationary region.

11. The storage medium according to claim 9, wherein the determination comprising determination of that the target region is a region likely to be a stationary region when the reliability information for the target region does not meet the criterion and a predetermined condition is satisfied, the predetermined condition comprising a condition that target region is not extracted as a stationary region.

12. The storage medium according to claim 9, wherein the program further causes the computer to perform generating the reliability information for the target region based on a ratio of stationary regions to regions corresponding to the target region in image frames captured in the first time period.

* * * * *